United States Patent [19]
Nobs

[11] 3,735,991
[45] May 29, 1973

[54] STUFFING BOXES
[75] Inventor: Hugo Nobs, Basel, Switzerland
[73] Assignee: Maschinenfabrik Burckhardt AG, Basel, Switzerland
[22] Filed: Apr. 7, 1971
[21] Appl. No.: 132,161

[30] Foreign Application Priority Data
Apr. 7, 1970 Switzerland..........................5128/70

[52] U.S. Cl....................................277/27, 277/105
[51] Int. Cl..........................F16j 15/16, F16j 15/40
[58] Field of Search.......................277/27, 102, 105, 277/123, 124, 125, 193, 198

[56] References Cited
UNITED STATES PATENTS

| 824,692 | 6/1906 | Hiatt | 277/105 |
| 934,627 | 9/1909 | Rhodes | 277/105 |
| 1,958,221 | 5/1934 | Wilcox | 277/105 |
| 3,348,849 | 10/1967 | Newcomb et al. | 277/27 |
| 3,438,638 | 4/1969 | Newcomb et al. | 277/27 |

Primary Examiner—William F. O'Dea
Assistant Examiner—Peter D. Ferguson
Attorney—Markva & Kruger

[57] ABSTRACT

The stuffing box comprises a chamber having gland rings adapted to fit therein. The gland rings are tightly held within the gland chamber by a movable neck that compresses the gland ring within the gland chamber. At least one packing ring chamber is formed between adjacent gland rings. The packing ring chamber accommodates a packing ring means that engages the member which reciprocates within the gland chamber. The packing ring chamber is formed by a first cavity portion located in one of the adjacent rings and a second cavity portion located in the other of the adjacent gland rings. Sealing surfaces are provided on each of the adjacent gland rings and cooperate with the surface of the packing ring means to effect the desired seal within the packing ring chamber. That is, the packing ring chamber accommodates the packing ring means. The sealing surfaces are not in the same plane with the line of contact formed between the adjacent gland rings.

13 Claims, 5 Drawing Figures

Patented May 29, 1973 3,735,991

INVENTOR
HUGO NOBS
BY Macker & Smith
ATTORNEYS

STUFFING BOXES

BACKGROUND OF THE INVENTION

Stuffing boxes are used to prevent leakage along a moving part such as a piston rod. The moving part passes through a hole in a vessel which contain fluid media such as steam, water or oil. The device of this invention is for use in cylinders of high pressure, reciprocating compressors, or pumps. Such a device comprises a box or chamber that holds packing tightly around the moving part. These sealing devices or stuffing boxes are also referred to as glands and include a movable neck by which the packing is compressed.

There are many forms of packing construction in prior art glands. This invention is related to the type of gland which includes glands rings, at least on packing ring chamber formed between adjacent gland rings, and a packing ring disposed in the packing ring chamber while being engaged with the reciprocating compressor or pump part. Such prior art glands are designed to operate at pressures of up to several thousand atmospheres. Therefore, the materials which form the gland rings must withstand extremely high stresses that are far greater than those occurring in machines working at lower pressures. The type of prior art glands to which the instant invention is directed is shown in FIGS. 1–3 and will be described in more detail hereinbelow.

There is a steady change in the pressure head occurring in the cycle of the machine with which the gland is being used. Such a change in the pressure head causes loading peaks inside the gland chambers thereby effecting fatigue fractures in the material used in the gland ring construction. Such fatigue fractures particularly tend to occur at corners and edges and are commonly referred to in the prior art as the "notch effect".

Where there is the action of a constant high internal pressure within the sealing chamber, the loading or tension peaks are generally non-injurious. This is generally true because the elastic limit of the material used in the construction of the gland rings is exceeded locally at the place of notching. Therefore, the tension peaks of the material which has sufficient elasticity can be compensated for by flowing and plastic deformation. With local restriction of the flow zone, there is no danger of a fatigue fracture.

PURPOSE OF THE INVENTION

The primary object of this invention is to provide a sealing device incorporating the use of gland rings wherein the particular construction thereof reduces or substantially obviates the problem of fatigue fractures.

Another object of this invention is to provide a device for preventing leakage around a moving part which operates at pressures of up to several thousand atmospheres and is capable of withstanding extremely high stresses which occur in the materials forming gland rings which are disposed in a chamber.

SUMMARY OF THE INVENTION

The invention is directed to a device for preventing leakage along a reciprocating member. More specifically, the invention relates to stuffing boxes referred to as glands for use in cylinders of high pressure, reciprocating compressors, or pumps. The device comprises a gland chamber having gland rings adapted to fit therein. The gland rings are tightly held within the gland chamber by a movable neck that compresses the gland rings within the gland chamber. At least one packing ring chamber is formed between adjacent gland rings. The packing ring chamber accommodates a packing ring means that engages the member which reciprocates within the gland chamber. The packing ring chamber is formed by a first cavity portion located in one of the adjacent rings and second cavity portion located in the other of the adjacent gland rings. Sealing surfaces are provided on each of the adjacent gland rings and cooperate with the surface of the packing ring to effect the desired seal within the packing ring chamber. That is, the sealing surfaces face each other in each packing ring chamber. The sealing surfaces are not in the same plane with the line of contact formed between the adjacent gland rings.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF PRIOR ART SPECIFIC EMBODIMENTS

Figures 1, 2, 3:
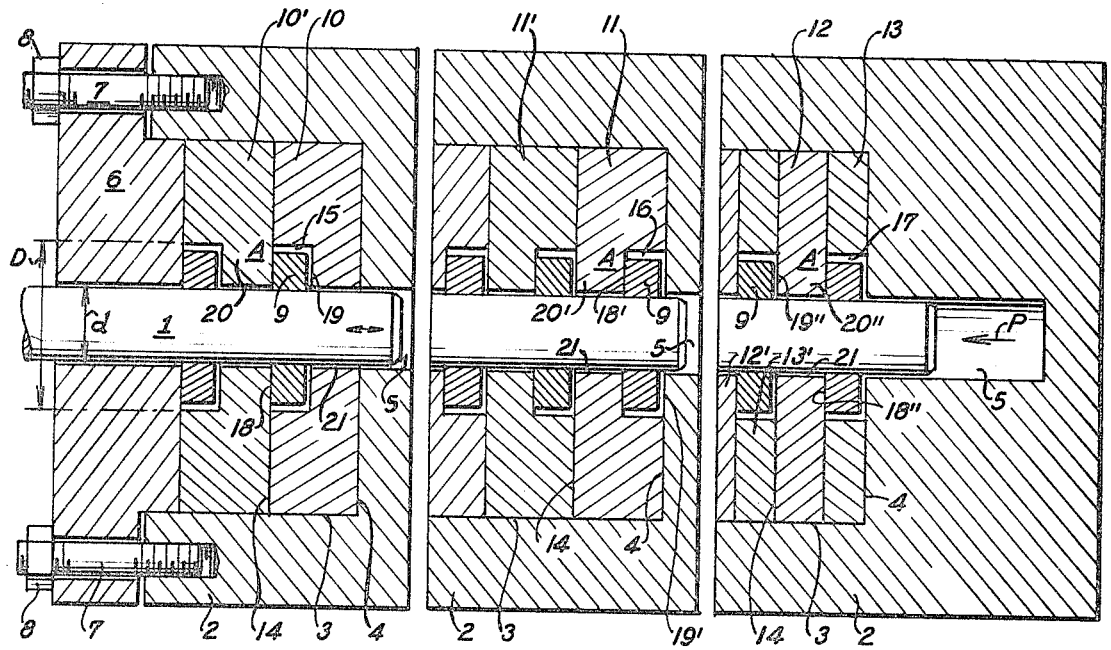
FIG. 1 is a sectional view of a gland made in accordance with the prior art.
FIG. 2 is a sectional view of another embodiment of a gland made in accordance with the prior art.
FIG. 3 is a sectional view of a further embodiment of a gland made in accordance with the prior art.

Three separate embodiments of the type of stuffing box or gland to which the present invention relates are shown in FIGS. 1, 2 and 3. A brief discussion of these prior art structures is deemed necessary to provide a full understanding of the gland or stuffing device made in accordance with the present invention.

A piston 1 having multipart packing rings 9 engaged therewith is disposed to reciprocate within the continuous bore 21 having a diameter $d$. The packing rings 9 embrace the piston 1 in a known manner in the prior art assemblies. The diameter $d$ of the continuous bore 21 in each example lies coaxially to the piston stroke bore 5 and acts as a guide for the piston 1. The diameter $d$ is greater than the diameter of the working piston 1 so that the fluid medium under pressure in the packing ring accommodation spaces flows in along the piston 1. Therefore, in any contingent piston movement departing from the axis, no running can take place at the wall inside the bore 21. This same type construction is used in the embodiment of the present invention shown in FIG. 4.

In the three prior art embodiments shown in FIGS. 1 – 3, more than one gland ring is disposed in the chamber bore 3 formed within the cylinder body 2. Rings 10 and 10' are shown in FIG. 1; rings 11 and 11' are shown in FIG. 2; and rings 12',13', 12 and 13 are shown in FIG. 3. These gland rings are held tightly in place within the chamber bore 3 by the neck compressing ring 6 which is forced against the gland rings by screwing the nuts 8 tightly onto the screws 7. Flat, annular seating surfaces 14 are constructed as sealing surfaces. That is, there is a seal of the gland ring internal space which is under high pressure against the exterior.

In each prior art embodiment, a packing ring cavity or chamber is coaxial with the continous bore 21, has a diameter D and accommodates packing rings 9. The packing ring chambers are located completely in a single gland ring 10, 10' and 11,11' in FIGS. 1 and 2, respectively. Annular discs 12',13', 12 and 13 comprise the gland rings in the embodiment shown in FIG. 3. The packing ring chambers used for accommodating the packing rings 9 in this particular embodiment are thereby formed by the bore diameter D and adjacent surfaces of gland rings 12' and 12 on the one hand and gland ring 12 and base surface 4 on the other.

The packing rings 9 are thrust against the flat annular sealing surfaces 18, 18' and 18'', when a high pressure P is effected in the direction of the arrow within the piston stroke space 5. The high pressure P is shown to be on the high pressure side of the gland or stuffing box. The flat, annular sealing surfaces 18 and 18'' are in the same plane as the flat annular seating surfaces 14 located between adjacent gland rings of the respective embodiments of FIGS. 1 and 3. The flat, annular sealing surface 18' lies at the base of the concentric packing ring chambers formed in the gland rings 11 and 11' of FIG. 2.

The depth of the packing ring chambers is determined by the width of the packing rings 9 and the depth of gaps 19, 19' and 19'' as shown in FIGS. 1, 2 and 3, respectively. The gaps 19, 19' and 19'' are necessary for the lateral mobility of the packing rings and for the pressure impingement effected during the stroke of the piston 1. As is known, the packing ring means 9 has a total thickness less than the total depth of the packing ring chamber forming gaps 19, 19' and 19'' to allow the lateral movement of the ring means 9 from one sealing surface to the other sealing surface when the piston member 1 reciprocates.

The seat joints 20, 20' and 20'' of each respective prior art embodiment are defined by the diameters D and d and are exposed to the full action of the pressure P effected in the piston stroke space 5 along the axis of the piston 1. Sealing along the seat joints 20, 20' and 20'' effects closure of the packing ring accommodation spaces 15, 16 and 17, respectively. The pressure between the intake and compressing pressure alternates in high pressure piston compressors or pumps with each revolution of the machine in each of the packing ring spaces 15, 16 and 17. Given a full sealing action of the packing ring 9 adjacent the piston stroke space 5, the accommodation spaces 15, 16 and 17 are fully acted upon by the action of the changing pressures. With these alternating pressures, the maximum stress is not necessarily the cause of a fracture, but rather, the difference between the maximum and minimum stresses occurring in the material.

The danger point at which fatigue fracture is likely to occur is located at the circular edge contact zone A adjacent the diameter D. It is at this point that the seat joints 20,20', and 20'' are subjected in the direction from the side, without pressure, to a flexing action. Zone A in the material itself, however, is subjected to alternating tensile stresses. Furthermore, as a result of the elastic behavior of the material in the high pressure range, expansion of the bores D and d takes place under the action of pressure. The total amount of expansion of the material is dependent upon the internal and external diameters of the gland structure.

As a further result of the elastic behavior of the material used in the construction of the gland rings, an expansion of the bore D corresponds to the pressures acting thereon. The annular sealing surfaces 14 are initially stressed by a force produced when the nuts 8 are tightened on screws 7. The gland rings are then exposed to the expansion of the bore diameter D thereby resulting in additional tensile stresses occurring along the annular contact zone A. Because there is a high compression force between the contacting surfaces between the gland rings in each embodiment, a projection is formed in the annular contact zone A by the elastic deformation of the material. This projection gives rise to a corner causing a "notch effect" at a transition to the ring surface 14. The tensile stresses occurring on the flexing of seat joints 20, 20' and 20'' along with the tensile stresses occurring with the expansion of the ring surface 14 under the influence of the notch effect result in high tension peaks occurring in the corner or annular contact zone A. These peaks occurring in accordance with alternating pressure action in the material lead to such high tensile-alternating stresses that a fatigue fracture is caused at zone A. In practice, these fatigue fractures occur even in gland rings made of materials of very high strength.

DESCRIPTION OF SPECIFIC EMBODIMENTS

Figure 4:
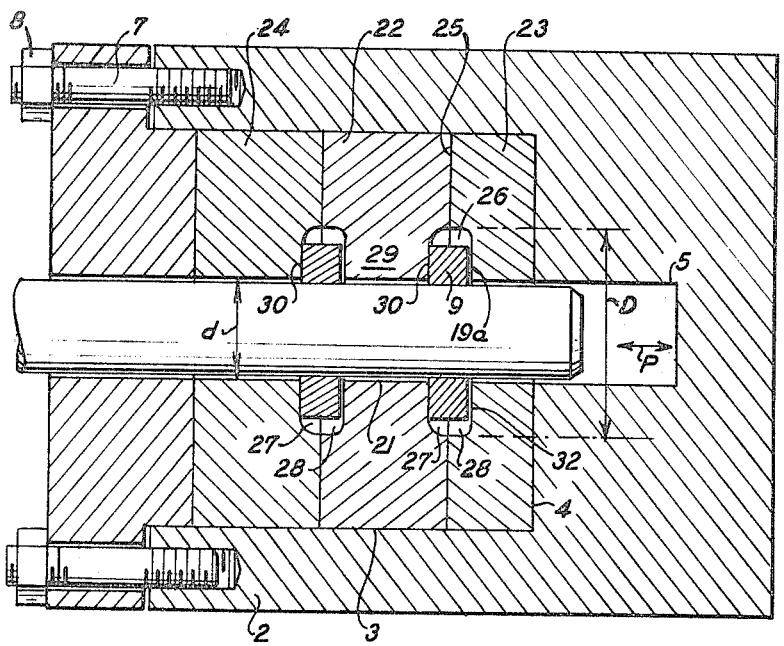
FIG. 4 is a longitudinal sectional view of a gland made in accordance with the present invention.

The gland construction as shown in FIG. 4 illustrates a device made in accordance with the instant invention. Packing rings 9 are located in packing ring chambers or accommodation spaces 26 which are formed between gland rings 22 and 23 and between gland rings 22 and 24. The gland rings 22, 23 and 24 are inserted in the chamber bore 3 of the cylinder 2 and are disposed coaxially with respect to the piston 1. The gland rings 22, 23 and 24 are compressed against the gland chamber base 4 by tightening the nuts 8 on the screws 7 to force the neck compression ring 6 thereagainst. By this action, the annular seating surfaces 25 are constructed as sealing surfaces forming an effective seal of a packing ring space within the chamber bore 3. The gland rings 22, 23 and 24 are preferably made of an alloy steel having a tensile strength of 90 to 110 kg/mm². The packing rings 9 consist of bronze.

The construction and function of the continuous bore 21, the piston stroke bore 5, and the piston 1 and the gap 19a correspond to the like elements discussed hereinabove.

Figure 5:
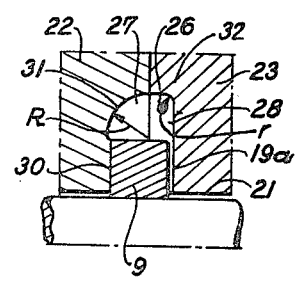
FIG. 5 is a partial sectional view showing the detail of a packing ring chamber and packing ring as shown in the gland of FIG. 4.

The packing ring chamber or accommodation space 26 comprises a first cavity portion or recess 27 formed in the gland rings 22 and 24 on the side thereof facing the piston stroke space 5 which is located on the high pressure side of the gland construction. The first cavity portion or recess 27 has a diameter D and a radiused portion 31 as shown in FIG. 5. The radiused or transition portion 31 starts from the sealing surface 30 and runs into the annular contact zone A adjacent the diameter D. As is evident from the drawings, the radiused portion 31 is facing the high pressure side of the gland construction. The transition or radiused portion 31 has a profile which gives a form factor with respect to the "notch effect". This form factor and the construction of the transition or radiused portion 31 limits the tensile peaks to safe levels for the material used in the construction of the gland rings 22 and 24. In this specific embodiment, the profile of the transition portion 31 has a uniform, sufficiently large radius R.

The "form factor" is used to take into account the reduction of strength by a notch. It can be defined as the following quotient:

Form factor = maximum strength/nominal strength the nominal strength being that strength which is calculated by the elementary classical methods. The radius R of the transition portion 31 is to be chosen in such a way that the form factor—which depends upon the notch profile—is rather favorable and the maximum strength will thus be limited to a harmless value.

The radius R, which is intended to avoid a sharp corner or notch, should be chosen with respect to two basic considerations:
1. It should not be too small in consideration of the resulting notch effect
2. It should not be too great in order to limit the dimensions of the recesses 27 and 28, which when filled with pressure medium are subjected to considerable forces.

The actual value of R will therefore be the result of a compromise. It will, however, be considered that there should be a tangential transition from the radiused portion A to the adjacent rectilinear wall portion.

A second cavity portion or recess 28 is formed in gland rings 22 and 23 to constitute, together with the first cavity portions or recesses 27, the accommodation space or packing ring chamber 26 of this specific embodiment. The second cavity portion or recess 28 has the same diameter D as the first cavity portion or recess 27. The total width of the packing ring 9 and the gap 19a determines the total depth of the packing ring chamber 26. That is, the packing ring 9 has a total thickness less than the total depth of the chamber 26 to form the gap 19a between a sealing surface of the chamber 26 and the packing ring 9. The difference between the diameter D and that of the packing ring 9 depends upon the choice of the radius R. The depth of the recesses 27 and 28 is also a function of the value of R.

As shown in FIG. 5, the corner at the base of the cavity portion or recess 28 receives a radiused portion 32 having a radius $r$ which can be determined or freely chosen according to the space available.

The sealing surface 30 is adjacent the radiused portion 31 along the side of the gland rings 22 and 24 which faces the piston stroke space 5. The width of the gland ring 22 is, in this specific embodiment, determined by the depth of both recesses 27 and 28 and by the height of the seal joint 29 defined by the diameters D and $d$. FIG. 4 shows the different parts in scale, i.e., in a real dimensional relationship. The sealing surface 30 is therefore not in the same plane as the annular seating surfaces 25. The annular surface 25 may be located at the midway point of the chamber 26. The depth of the recess 27 is a function of the form factor and of R; the depth of the recess 28 results from the width of the packing ring 9 and of the gap 19.

It is essential that the packing ring 9 nearest the piston stroke space 5 causes a full sealing effect so that the bore 21 behind this packing ring 9 is pressure loaded. The inner side of the packing ring space 26 arranged between the chamber rings 22 and 23 and having the diameter D is, in this particular embodiment, completely exposed to the action of the alternating levels of pressure.

Full sealing effects of the packing ring 9 occur on the sealing surfaces 30 and on the outer surface of the piston 1 during its longitudinal movement. During the full sealing effect cycle, suction and compression act alternatingly on the surface of the seat joint 29. The seat joint 29 is thus subjected to flexing in the direction of a low pressure side behind the sealing ring 9 whereby tensile stresses of alternating magnitude occur in the radiused portion 31.

In the recess or cavity portion 28, located at the base of the seat joint 29, is located the radiused portion 32 having a radius $r$. This radiused portion 32 is under the action of alternating stresses due to action of the pressure. The stresses effected during operation of the piston 1 do not involve any danger in this particular instance. It is therefore possible to make the radiused portion 32 with smaller radius than the radius of the radius R of the radiused portion 31 which is under tensile stress.

An expansion of the pressure loaded cavity portions or recesses 27 and 28 takes place during the suction and compression occurring because of the elastic behavior of the material which is under the influence of the high pressure operation. This expansion is dependent on the diameter D and the chamber ring external diameter so that no frictional forces arising from the initial stress force are caused in the contact zone A thus causing additional tensile stresses. The expansion of the recesses 27 and 28 are equal, so that no frictional forces occur in the ring face 25 between the two adjacent gland rings 22 and 23; there is, in other words, no relative movement between the two gland rings 22 and 23. Furthermore, the recesses 27 and 28 have the advantage that no projections are formed at the delimiting surfaces causing a "notch effect" and with it tensile stress peaks in the material. The initial stress force is applied through the bolts 7 and nuts 8 pressing the neck ring member 6 against the gland rings.

Tensile stresses of alternating magnitude will occur in contact zone A in the material as shown in FIG. 4. The stresses occur by the flexing of the seating joint 29 corresponding to stress peaks resulting from the "notch effect". However, these stresses are kept within such reduced limits by the influence of the relatively large radiused portion 31 that any formation of a crack causing a fatigue fracture is substantially obviated.

While the stuffing boxes have been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A gland including a bore which slidably receives a reciprocating piston member and having a high pressure side and a low pressure side, said gland comprising:
   a. a gland chamber,
   b. gland rings fitting in the gland chamber, and
   c. at least one annular packing ring chamber disposed between adjacent gland rings having sealing surfaces facing each other within each packing ring chamber,
   d. said packing ring chamber accommodating a gland packing ring means which is movable between said sealing surfaces, e. the outer perimeter of the annular packing ring chamber being radiused at the edge of the annulus facing toward the high pressure side of the gland,
f. said gland packing ring means having a total thickness less than the total depth of the packing ring chamber forming a gap to allow lateral movement of the ring means from one sealing surface to the other sealing surface when the piston member reciprocates,
g. said packing ring chamber including a first cavity portion located in one of the adjacent gland rings and a second cavity portion located in the other adjacent gland ring.

2. A gland as defined in claim 1 wherein
said chamber includes a first radiused portion at the edge of the outer perimeter of the annulus facing toward the high pressure side and a second radiused portion at the edge of the outer perimeter of the annulus facing toward the low pressure side, the radius of the second radiused portion being less than the radius of the first radiused portion.

3. A gland as defined in claim 1 wherein
the packing ring chamber includes a radiused portion and a seating surface for contact with the packing, said radiused portion extending along the outer perimeter and facing towards said high pressure side, said seating surface extending between the inner periphery of the annulus and the radiused portion.

4. A gland as defined in claim 3 wherein
there is a line of contact between the adjacent gland rings and
the seating surface of the packing ring chamber is located in a plane which does not include said line of contact.

5. A gland as defined in claim 1 wherein
there are two packing ring chambers each accommodating said packing ring means.

6. In an apparatus including a movable part and having a high pressure side and a low pressure side, the combination comprising:
a. a gland chamber disposed around the movable part,
b. gland rings fitting in the gland chamber, and
c. at least one annular packing ring chamber disposed between adjacent gland rings having sealing surfaces facing each other within each packing ring chamber,
d. said packing ring chamber accommodating a gland packing ring which is movable for contact with each of the sealing surfaces,
e. the outer perimeter of the annular packing ring chamber being radiused at the edge of the annulus facing toward the high pressure side of the gland,
f. said gland packing ring having a total thickness less than the total depth of the packing ring chamber forming a gap to allow lateral movement of the ring from one sealing surface to the other sealing surface when the movable part is moving,
g. said packing ring chamber including a first cavity portion located in one of the adjacent gland rings and a second cavity portion located in the other adjacent gland ring.

7. In an apparatus as defined in claim 6 wherein
said chamber includes a first radiused portion at the edge of the outer perimeter of the annulus facing toward the high pressure side and a second radiused portion at the edge of the outer perimeter of the annulus facing toward the low pressure side, the radius of the second radiused portion being less than the radius of the first radiused portion.

8. In an apparatus as defined in claim 6 wherein
the packing ring chamber includes a radiused portion and a seating surface for contact with the packing, said radiused portion extending along the outer perimeter and facing towards said high pressure side, said seating surface extending between the inner periphery of the annulus and the radiused portion.

9. In an apparatus as defined in claim 8 wherein
there is a line of contact between the adjacent gland rings and
the seating surface of the packing ring chamber is located in a plane which does not include said line of contact.

10. A gland including a packing and having a high pressure side and a low pressure side, said gland comprising:
a. a gland chamber,
b. gland rings fitting in the gland chamber, and
c. at least one packing ring chamber disposed between adjacent gland rings,
d. said packing ring chamber accommodating said gland packing,
e. said packing ring chamber including a first cavity portion located in one of the adjacent gland rings and a second cavity portion located in the other adjacent gland ring,
f. the packing ring chamber is annular and includes a radiused portion and a seating surface for contact with the packing,
g. said radiused portion extending along the outer perimeter and facing towards said high pressure side,
h. said seating surface extending between the inner periphery of the annulus and the radiused portion.

11. A gland as defined in claim 10 wherein
there is a line of contact between the adjacent gland rings and
the seating surface of the packing ring chamber is located in a plane which does not include said line of contact.

12. In an apparatus having a movable part, the combination comprising:
a. a gland chamber disposed around a movable part and having a high pressure side and a low pressure side,
b. gland rings fitting in the gland chamber, and
c. at least one packing ring chamber disposed between adjacent gland rings,
d. said packing ring chamber accommodating a gland packing,
e. said packing ring chamber including a first cavity portion located in one of the adjacent gland rings and a second cavity portion located in the other adjacent gland ring,
f. the packing ring chamber is annular and includes a radiused portion and a seating surface for contact with the gland packing,
g. said radiused portion extending along the outer perimeter and facing towards said high pressure side,
h. said seating surface extending between the inner periphery of the annulus and the radiused portion.

13. In an apparatus as defined in claim 12 wherein
there is a line of contact between the adjacent gland rings and
the seating surface of the packing ring chamber is located in a plane which does not include said line of contact.

* * * * *